United States Patent [19]
Suzuki et al.

[11] Patent Number: 5,642,852
[45] Date of Patent: Jul. 1, 1997

[54] METHOD OF ULTRASONIC WELDING

[75] Inventors: Masataka Suzuki; Hiroyuki Ashiya; Yoshiyuki Tanaka; Shinobu Mochizuki; Koji Koike, all of Haibara-gun, Japan

[73] Assignee: Yazaki Corporation, Tokyo, Japan

[21] Appl. No.: 638,753

[22] Filed: Apr. 29, 1996

[30] Foreign Application Priority Data

Apr. 28, 1995 [JP] Japan .................................. 7-106039

[51] Int. Cl.$^6$ ................................................ H01L 21/607
[52] U.S. Cl. ........................................ 228/110.1; 228/214
[58] Field of Search ............................. 228/110.1, 111, 228/214, 1.1, 5.5, 106; 256/73.2

[56] References Cited

U.S. PATENT DOCUMENTS

| | | | |
|---|---|---|---|
| 3,998,377 | 12/1976 | Metz | 228/106 |
| 5,147,082 | 9/1992 | Krause et al. | 228/110.1 |

FOREIGN PATENT DOCUMENTS

| | | | |
|---|---|---|---|
| 3437749 | 4/1986 | Germany | 228/110.1 |
| 1-139986 | 9/1989 | Japan. | |
| 6-155051 | 6/1994 | Japan. | |

*Primary Examiner*—Samuel M. Heinrich
*Attorney, Agent, or Firm*—Nikaido, Marmelstein, Murray & Oram LLP

[57] ABSTRACT

To weld a flat conductor to another bonding member reliably without leaving a welding scar, a conductive protective member, such as copper plate or the like, with a higher strength than that of a low strength conductive member is placed between the low strength conductive member such as a flat conductor and the horn tip or the anvil to perform welding with the low strength conductive member sandwiched between the protective member and another bonding member such as stranded conductor or the like.

7 Claims, 4 Drawing Sheets

METHOD OF ULTRASONIC WELDING

BACKGROUND OF THE INVENTION

1. Field of Invention

The present invention relates to a method of ultrasonic welding with which a low strength conductive member, such as a flat conductor, can be reliably welded to another bonding member without creating a welding scar inflicted by the horn tip or the anvil.

2. Brief Description of the Prior Art

In an ultrasonic welding machine such as shown in FIG. 5, at the front end of the horn of a ultrasonic welding machine 25, a horn tip 26 is secured to function as one portion of a welding jig and an anvil 28 is secured on a base table 27 facing opposite the horn tip 26, to function as another portion of the welding jig. A bonding member is set on the anvil 28 and when the horn 29 is lowered to come in contact with the bonding member, the horn tip 26 ultrasonically vibrates in the lengthwise direction so that the individual bonding members can be connected to each other by welding.

As the bonding members, a copper plate member 30, a flat conductor of a flat wire 31 or copper foil may be used, for instance. As shown in FIG. 6, at another end of the copper plate member (joint member) 30, a stranded conductor 34 of a electrical wire 33 is welded in a similar manner and, with this, the flat wire 31 and the electrical wire 33 are electrically connected.

At the lower end surface (working surface) of the horn tip 26, indented portions 35 and projected portions 36 are formed to form cross shapes, as shown in FIGS. 7 and 8, for instance, and it is possible to communicate ultrasonic waves to the bonding members efficiently (Japanese Utility Model Laid Open No. 1989-139986).

However, when welding a low strength conductive member such as the flat conductor 32 or a copper foil using the horn tip 26 provided with the indented portions 35 and projected portions 36 forming cross shapes described above, since the projected portions 36 come in contact with the low strength conductive member 32 diagonally relative to the lengthwise direction of the low strength conductive member 32 and the projected portions run at right angles to each other, the flat conductor 32 tends to develop an indented welding scar 37 relative to the copper plate member 30 such as a bus bar, as shown in FIG. 9. It has been confirmed, based upon measurements of the peeling strength made by pulling the bond apart vertically relative to the bonding surface 38, that in such a case, peeling does not occur starting from the bonding surface 38 but rather a rupture tends to occur starting at the root 39 of the bonding portion, due to the welding scar 37, reducing the strength of the low strength conductive member such as the flat conductor 32.

SUMMARY OF THE INVENTION

It is accordingly, an object of the present invention is to provide a method of ultrasonic welding with which it is possible to reliably weld a thin conductive member, i.e., a low strength conductive member such as a flat conductor or a metal foil to another bonding member such as a bus bar or a stranded conductor without leaving a welding scar inflicted by the horn tip.

In order to achieve the object described above, the present invention is a method of ultrasonic welding for connecting through welding a low strength conductive member to another bonding member between a horn tip and an anvil, in which a conductive protective member with a higher strength than that of the low strength conductive member is placed between the low strength conductive member and the horn tip or the anvil so that welding is performed with the low strength conductive member being sandwiched between the protective member and the other bonding member.

In the method of ultrasonic welding described above, the low strength conductive member is separated from the horn tip or the anvil by the protective member. Since the low strength conductive member does not come in contact with the horn tip or the anvil, no welding scar is created on the low strength conductive member during ultrasonic welding, preventing a reduction in the strength of the low strength conductive member.

DETAILED DESCRIPTION OF THE PREFERRED EMBODIMENTS

Figure 1:
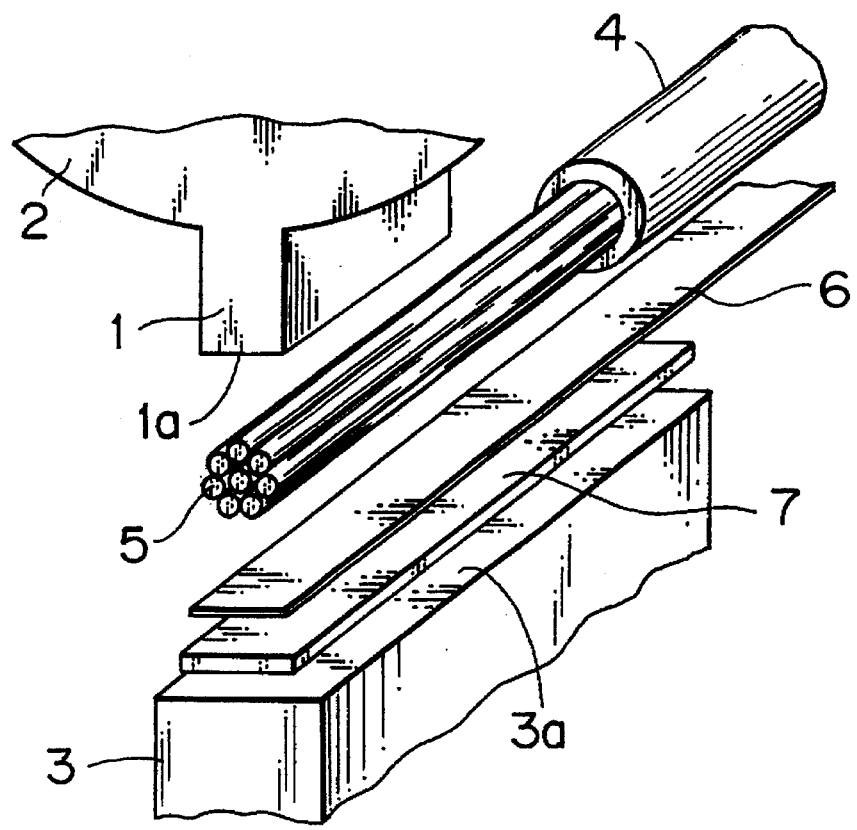
FIG. 1 is an exploded perspective view showing a first embodiment of the method of ultrasonic welding according to the present invention.
Figure 2:
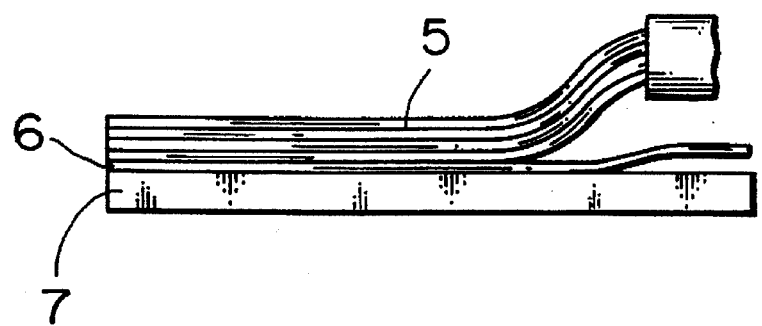
FIG. 2 is a side view showing a welded state in the method of the first embodiment.
Figure 5:
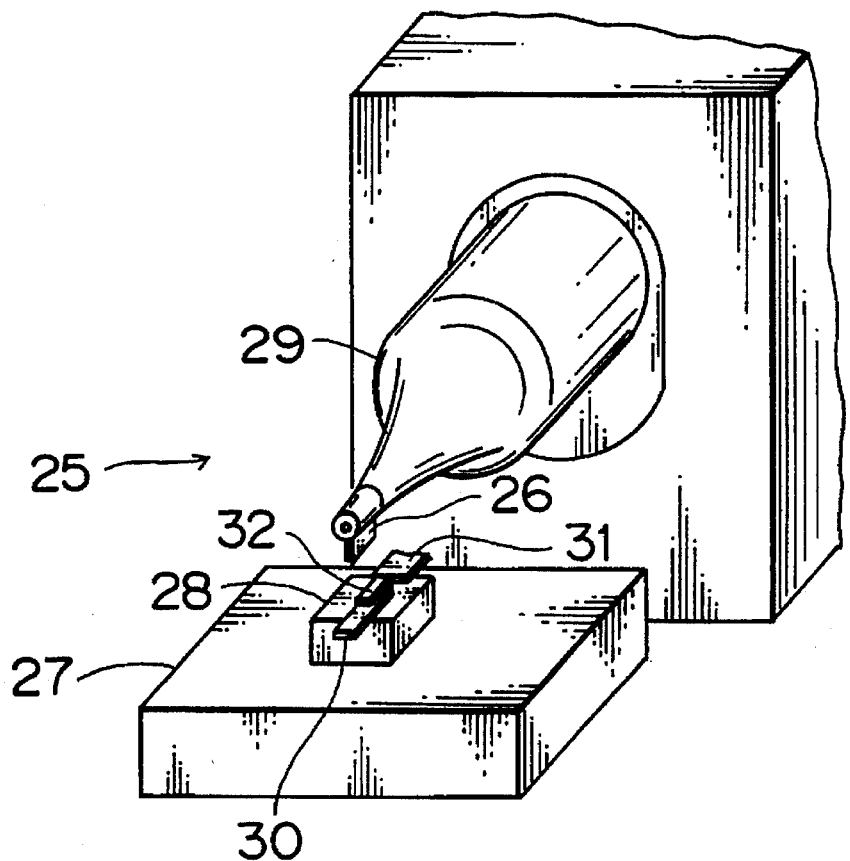
FIG. 5 is an external perspective view of an ultrasonic welder.

Referring now to FIGS. 1 and 2, FIG. 1 shows the first embodiment of the method of ultrasonic welding according to the present invention. In the figure, reference number 1 indicates a horn tip (welding head) of an ultrasonic welding horn 2, as explained earlier in reference to the prior art technology (FIG. 5) and reference number 3 indicates an anvil positioned facing opposite the horn tip 1. At a lower end surface (working surface) 1a of the horn tip 1, indentations and projections (not shown) for preventing slippage are formed.

Since the object of this embodiment is to reliably connect through welding a stranded conductor 5 of an electrical wire 4 and a flat conductor 6. In order to achieve this, the embodiment adopts a method in which a copper plate member 7 is placed on the anvil 3 to function as a protective member, the flat conductor 6 of foil, which is the low strength conductive member, is placed on the copper plate member 7 and the stranded conductor 5 is placed on the flat conductor 6. In other words, the thin flat conductor 6 is sandwiched between the stranded conductor 5 and the copper plate member (protective or reinforcing member) 7 to ensure that it does not come in contact with the anvil 3 or the horn tip 1.

The copper plate member (protective or reinforcing member) 7 is required to have a higher degree of strength than the flat conductor 6. For instance, the copper plate member 7 functioning as a protective member with a thickness of approximately 0.4 mm will provide sufficient strength relative to the flat conductor 6 with a thickness of 30 μm. The horn tip 1 is pressed in contact against the stranded conductor 5, the anvil 3 is in contact with the copper plate member (protective or reinforcing member) 7 and the flat conductor 6 is sandwiched between the stranded conductor 5 and the copper plate member (protective or reinforcing member) 7 so that it does not come in contact with the anvil 3 or the horn tip 1.

As shown in FIG. 2, the stranded conductor 5, the flat conductor 6 and the copper plate member (protective or reinforcing member) 7 are welded together. When there are indentations and projections (not shown) for preventing slippage formed on the working surface 1a of the horn tip 1 and/or a working surface 3a of the anvil 3, the stranded conductor 5 or the copper plate member (protective or reinforcing member) 7 is heated with a high degree of efficiency due to a high sliding resistance imparted by the indentations and projections, while the flat conductor 6 remains completely free of welding scars which may otherwise be caused by the indentations and projections, however, a welding scar may be formed on the stranded conductor 5 or the copper plate member 7.

Since no welding scar is formed on the flat conductor 6 due to the indentations and projections, it is possible to apply a high level of welding energy with the horn tip 1 and, consequently, bonding strength is improved.

Furthermore, even when excessively high welding energy is applied, the flat conductor 6 remains free of any adverse effects, achieving a sufficient bonding strength.

Figure 6:
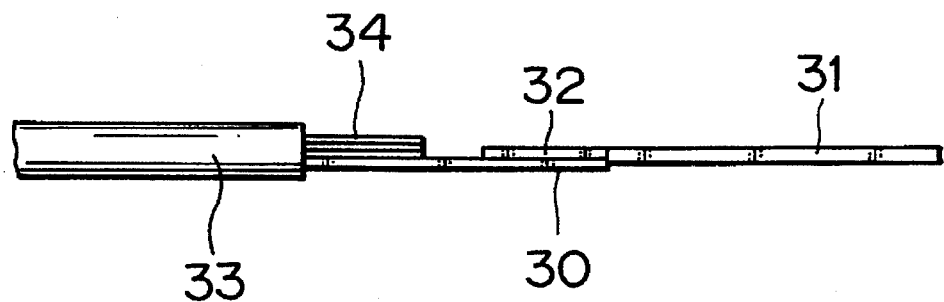
FIG. 6 is a side elevation of the welding structure of individual bonding members in the prior art.
Figure 7:
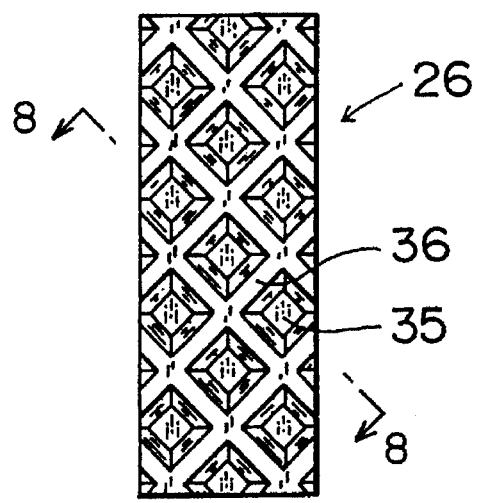
FIG. 7 is a plan view of the shapes of the indentations and projections on a horn tip in the prior art.
Figure 8:
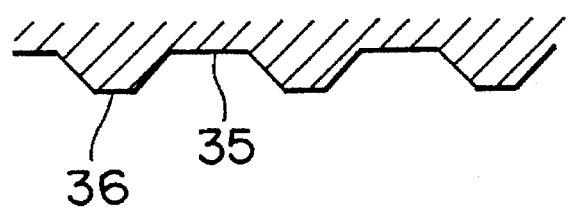
FIG. 8 is a cross section through line B—B in FIG. 7.
Figure 9:
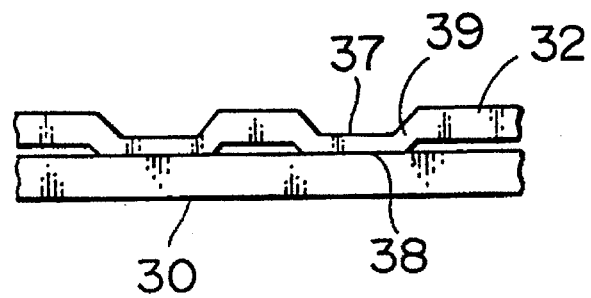
FIG. 9 is a side elevation illustrating the problem in the prior art.

As an outcome of the ultrasonic welding in this embodiment, a peeling strength is obtained which is 1.5 to 2.5 times achieved that when bonding a flat conductor 6 and a stranded conductor 5, and a flat conductor 6 and a copper plate member 7 directly to each other, and no rupture whatsoever of the flat conductor 6 itself occurred in strength tests. In addition, the copper plate member 7, the stranded conductor 5 and the flat conductor 6 can be welded through a single bonding operation without having to separately bond a stranded conductor 34 and a flat conductor 32 to the two ends of a copper plate member (joint member) 30 as in the prior art shown in FIG. 6, achieving an improvement in the work efficiency.

Note that when bonding two flat conductors 6 and 6 to each other, the copper plate member 7 should be provided both at the upper side of one of the flat conductors 6 and at the lower side of the other flat conductor 6 to place each protective member 7 in contact with the horn tip 1 or the anvil 3.

Figure 3:
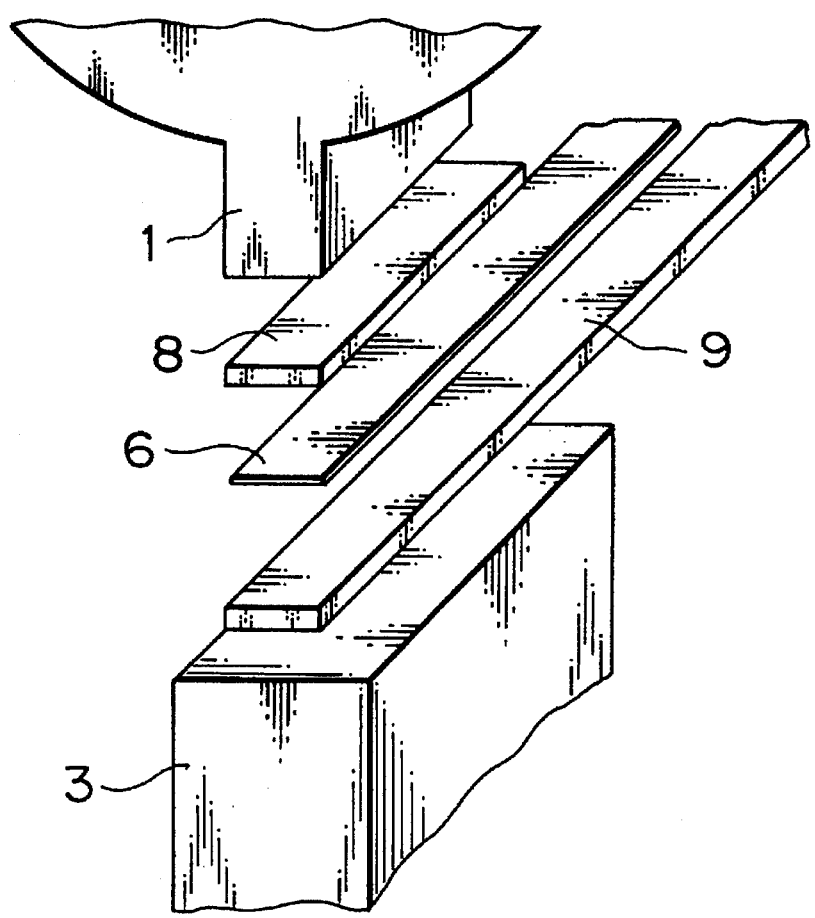
FIG. 3 is an exploded perspective view showing a second embodiment of the method of ultrasonic welding according to the present invention.

FIG. 3 shows the second embodiment of the method of ultrasonic welding. In this embodiment, instead of the stranded conductor 5 employed in the first embodiment, a copper plate member 8 constituting a protective member is positioned under the horn tip 1, a bus bar (copper plate) 9 is placed on the anvil 3 and welding is performed with the flat conductor 6 sandwiched between the copper plate member (protective or reinforcing member) 8 and the bus bar 9.

Figure 4:
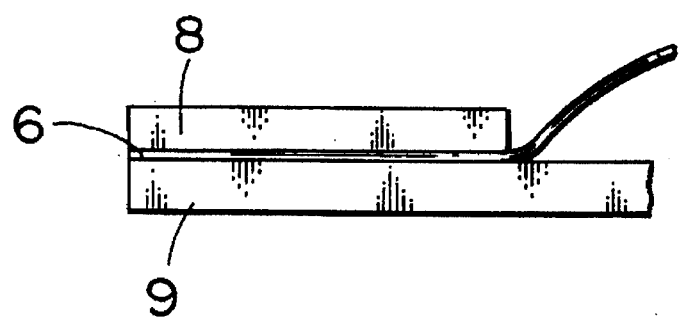
FIG. 4 is a side view showing a welded state in the method of the second embodiment.

The flat conductor 6, which is sandwiched between the copper plate member (protective or reinforcing member) 8 and the bus bar 9, does not come in contact with the horn tip 1 or the anvil 3, preventing any welding scar from being formed on the flat conductor 6. The flat conductor 6, placed between the copper plate member (protective or reinforcing member) 8 and the bus bar 9, is connected through welding as shown in FIG. 4. In this embodiment, too, a stable and high bonding strength can be obtained without reducing the strength of the flat conductor 6, as in the first embodiment.

As has been described, with the method of ultrasonic welding according to the present invention, since welding scars are prevented from being formed on a low strength conductive member such as a flat conductor during welding, thereby preventing any reduction in the strength of the low strength conductive member, a thin, flat conductor or the like can be reliably welded to another bonding member with sufficient welding strength.

What is claimed is:

1. A method of ultrasonic welding for connecting by welding a low strength conductive member such as a flat conductor to another bonding member between a horn tip and an anvil comprising the steps of:

placing a conductive protective member with higher strength than said low strength conductive member between said low strength conductive member and said horn tip or said anvil; and welding said low strength conductive member sandwiched between said protective member and said another bonding member.

2. A method of ultrasonic welding as defined in claim 1, wherein a flat copper plate is used as said high strength conductive protective member.

3. A method of ultrasonic welding as defined in claim 1, wherein a copper foil is used as said low strength conductive member and a stranded wire is used as said another bonding member.

4. A method of ultrasonic welding as defined in claim 1, wherein a copper foil is used as said low strength conductive member and a flat conductive wire is used as said another bonding member.

5. A method of ultrasonic welding as defined in claim 1, wherein a lower end surface of said horn tip is provided with indentations and projections.

6. A method of ultrasonic welding as defined in claim 1, wherein an upper end surface of said anvil is provided with indentations and projections.

7. A method of ultrasonic welding as defined in claim 1, wherein said conductive protective member is of a thickness of 0.4 mm and said low strength conductive member is of a thickness of 30 μm.

* * * * *